Figure 3:
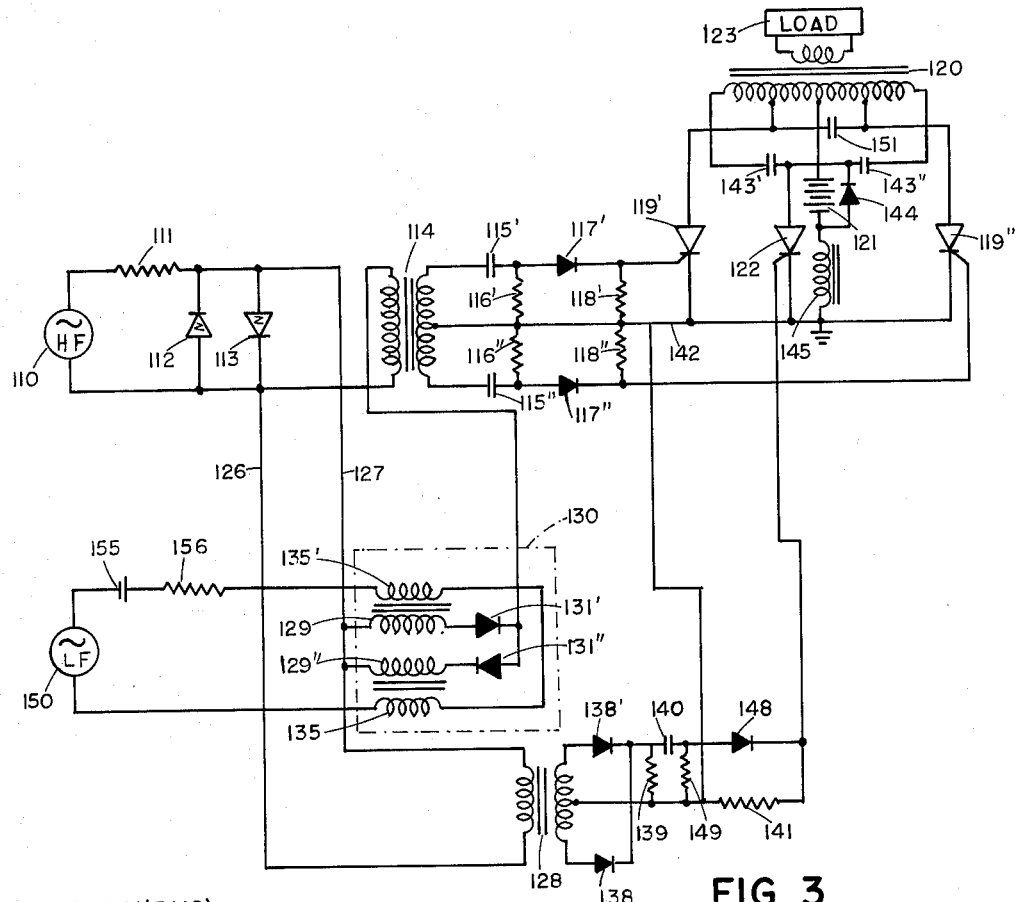

Sept. 21, 1965   R. H. PINTELL   3,207,931
CONTROLLABLE ALTERNATING-CURRENT CONVERTER
Filed June 29, 1961   2 Sheets-Sheet 1
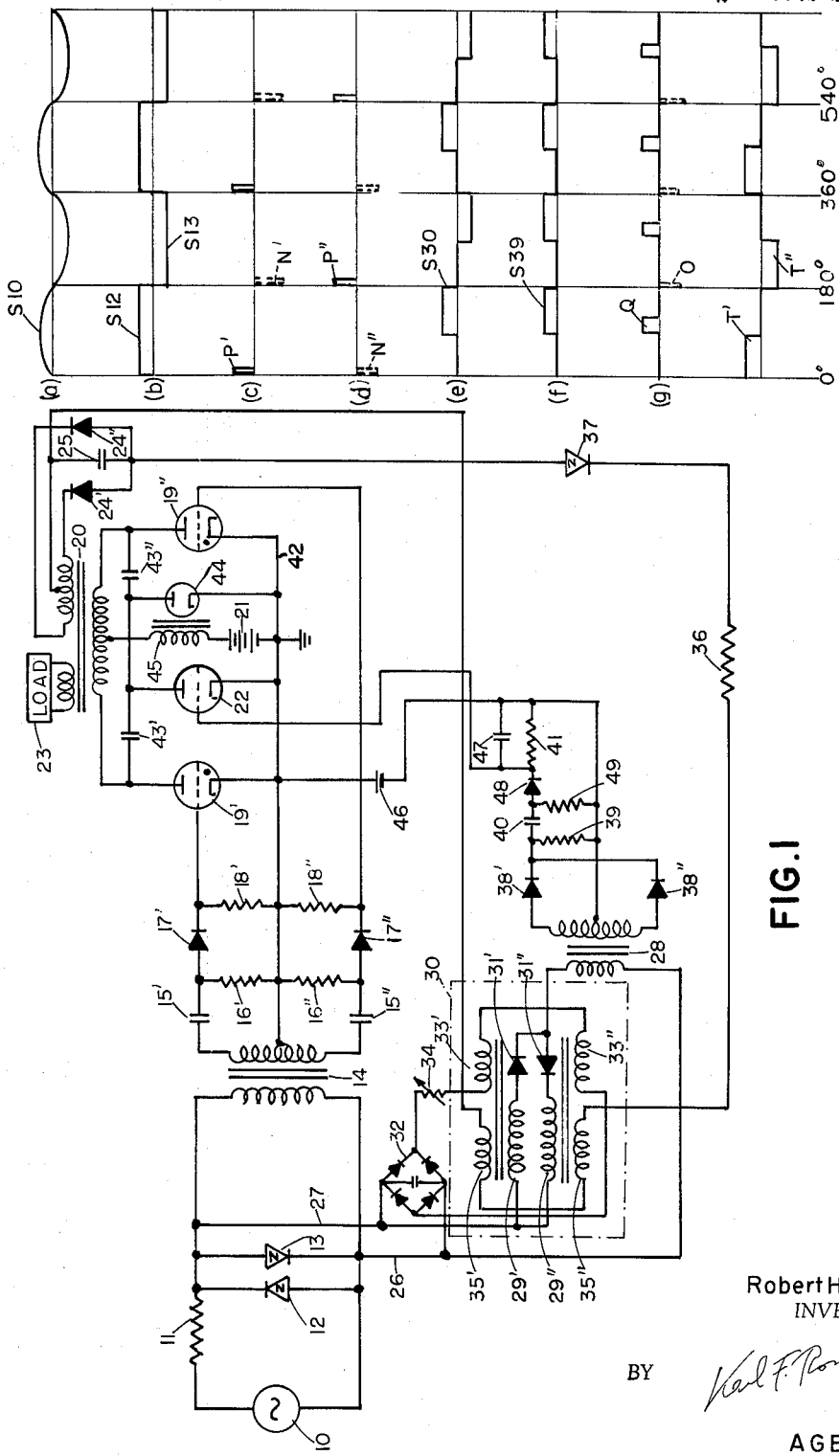
Robert H. Pintell
INVENTOR.
BY *Karl F. Ross*
AGENT.

United States Patent Office 3,207,931
Patented Sept. 21, 1965

3,207,931
CONTROLLABLE ALTERNATING-CURRENT
CONVERTER
Robert H. Pintell, New York, N.Y., assignor to Intron International, Inc., Bronx, N.Y., a corporation of New York
Filed June 29, 1961, Ser. No. 120,583
17 Claims. (Cl. 307—106)

My present invention relates to a circuit arrangement for producing an alternating current of controllable wave shape for the purpose of providing an output which is either stabilized at a predetermined level or variable in accordance with an input signal of relatively low frequency.

The use of gas thyratrons, ignitrons or equivalent solid-state devices, such as controlled rectifiers or four-layer diodes, as electronic switches in the generation of square-wave alternating current is well known. These three-electrode breakdown devices are generally connected in push-pull and are alternately triggered and quenched in the rhythm of a suitable control oscillation, the quenching being conventionally effected by means of a so-called commutating condenser connected across the output electrodes of these devices in such manner that the start of conduction through one device applies an extinction potential to the other. Since the condenser terminals are connected directly to the aforementioned output electrodes whose potentials are subject to abrupt changes, each change in conductivity is accompanied by a sudden charge reversal involving the flow of relatively large and wasteful switching currents.

It is, therefore, an object of my present invention to provide an improved circuit arrangement of the general type referred to in which the aforestated drawbacks are substantially eliminated and which, therefore, operates considerably more efficiently than known systems.

A more particular object of this invention is to provide means for conveniently varying the width of the square-wave pulses generated in such circuit arrangement for the purpose of controlling the magnitude of an output current applied with or without rectification to a load.

In my co-pending application Ser. No. 120,787, filed on even date herewith, I have disclosed and claimed a system in which a pair of electronic breakdown devices are connected in push-pull and are periodically de-energized, under the control of a suitable switching signal, by quenching means connected in their common operating circuit. My present invention concerns a further development of this system designed to afford an even higher gain in efficiency.

In accordance with the instant invention there are bridged across corresponding output electrodes (e.g., anodes) of the push-pull-connected breakdown devices at least two condensers in series, the quenching means further including a normally non-conductive circuit element which is triggerable into a conductive condition and is inserted between the common terminal of the condensers and the junction of the other output electrodes (e.g., cathodes) of these breakdown devices. A source of direct current, serving to energize the latter, is preferably connected in series with a stabilizing inductance to regulate the flow of discharge current through the branches of the system. In shunt with the circuit element forming part of the quenching means I prefer to connect a rectifier in such manner as to provide a return path for the suppression of spikes on the associated condenser upon the triggering of either breakdown device; the stabilizing inductance may be inserted in series with this diode for promoting the buildup of a potential of proper polarity on the condenser in order to insure the cessation of current flow through the respective breakdown device when the latter is effectively bridged across the condenser by the establishment of conduction through the quenching element.

The series-connected condensers may be tied to the output electrodes of the breakdown devices by way of other reactances, e.g., via inductances forming portions of an autotransformer winding adapted to increase the effective voltage across these condensers. The remainder of the winding may be bridged by a further condenser to create a desired resonance condition at the selected operating frequency, thereby further assisting in the quenching of the breakdown devices by the principle of resonant commutation disclosed in my above-identified application and in my earlier application Ser. No. 117,168 filed June 14, 1961. This will be particularly effective in the case of nearly spent thyratrons or other discharge devices which may thus be used to full advantage in my improved system.

Figure 4:
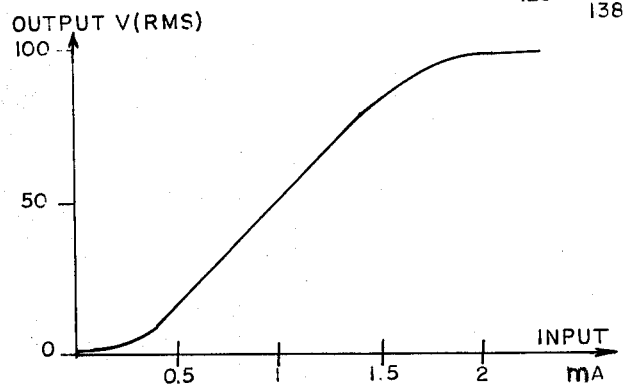

The above and other objects, features and advantages of my invention will become more fully apparent from the following detailed description, reference being made to the accompanying drawing in which:

FIG. 1 is a circuit diagram of one embodiment;
FIG. 2 is a set of graphs illustrating the mode of operation of a system as shown in FIG. 1;
FIG. 3 is a circuit diagram similar to FIG. 1, illustrating another embodiment; and
FIG. 4 is a graph representing the performance of a typical system embodying the invention.

The system shown in FIG. 1 comprises a source 10 of constant-frequency alternating current which serves only as a generator of switching signals and may therefore be of very low power. Connected across this source, in series with a ballast resistor 11, are a pair of oppositely poled avalanche-type or Zener diodes 12, 13 in parallel with each other and with the primary winding of an input transformer 14. The secondary of this transformer is center-tapped and feeds a balanced differentiation circuit including a pair of condensers 15', 15", two resistors 16', 16", a pair of rectifiers 17', 17" and two further resistors 18', 18". The ungrounded output terminals of the last-mentioned resistors are tied to the control grids of two push-pull-connected thyratrons 19', 19" whose cathodes are joined to the grounded bus bar 42 leading to the midpoint of the secondary of transformer 14 and whose plates are bridged by the primary of an output transformer 20, the center tap of this primary being connected through a choke 45 to the positive pole of a source of direct current, shown as a battery 21, whose negative pole is grounded. Output transformer 20 has two secondaries, one of them supplying current to a load while the other feeds back a part of the output of the system to a full-wave rectification network comprising a pair of diodes 24', 24" and a smoothing condenser 25.

The primary of transformer 20 is shunted by two condensers 43', 43" connected in series across the plates of thyratrons 19' and 19". The common terminal of these condensers is connected to the plate of a triode 22 whose cathode is tied to bus bar 42 along with those of thyratrons 19' and 19"; this common terminal is also returned to the negative pole of battery 21 by way of a vacuum diode 44 so poled as to oppose the charging of condensers 43', 43" from the battery.

A control circuit bridged across the primary of input transformer 14 comprises two conductors 26, 27 serving to energize, in series with the primary of a switching transformer 28, the main windings 29', 29" of a magnetic amplifier 30 having the usual diodes 31', 31" serially connected thereto. A rectifier bridge 32, connected across the conductors 26 and 27, feeds a pair of biasing windings 33', 33" of magnetic amplifier 30 by way of an adjustable resistor 34. Amplifier 30 also has two control windings 35', 35" connected across the condenser 25 in series with a resistor 36 and a Zener diode 37.

The secondary of transformer 28 is center-tapped, similarly to that of transformer 14, and connected across a balanced differentiation circuit designed as a pulse-frequency doubler, this circuit including two rectifiers 38', 38" working into a resistor 39 and, in parallel therewith, into the series combination of a condenser 40, a further diode 48 and a control resistor 41. The latter is connected across the cathode and the grid of diode 22, the rectifier 48 being so poled as to develop pulses of positive polarity across the resistor 41 for unblocking the tube 22 which is normally cut off by a biasing battery 46; resistor 41 is shown shunted by a condenser 47 serving to lengthen these positive pulses to a sufficient extent to insure full deionization of whichever thyratron, 19' or 19", has previously been triggered into a conductive condition by a positive pulse developed across the associated resistor 18' or 18". The relative timing of the two sets of positive pulses respectively passed by rectifiers 17', 17" and 48, controlled by the magnetic amplifier 30, determines the magnitude of the output of the alternating-current generator 19', 19", 20 as will now be described with reference to FIG. 2.

FIG. 2(a) shows a sine curve S10 representing the output of alternating-current source 10. Through the clipping action of Zener diodes 12, 13 this wave is converted into an alternation of flat-topped positive and negative pulses S12, S13, as shown in FIG. 2(b), which are transmitted by transformer 14 to the two branches 15', 16' and 15", 16" of its differentiation network to produce two trains of positive trigger pulses P', P" alternating with negative pulses N', N", the latter pulses being suppressed by the rectifiers 17', 17"; this has been illustrated in the graphs of FIGS. 2(c) and 2(d). Concurrently, through the operation of magnetic amplifier 30, there is developed across the primary of switching transformer 28 a stepped wave S30, FIG. 2(e), with the cadence of pulses S12, S13 but with leading edges lagging behind those of the latter at a rate determined by the degree of core saturation of the magnetic amplifier 30. Upon rectification by the diodes 38', 38", the stepped wave S39 developed across resistor 39 has the shape shown in FIG. 2(f). Positive quenching pulses Q, alternating with negative pulses O which are suppressed by the rectifier 48, are derived from the wave S30 by the differentiation network 39–41, as illustrated in FIG. 2(g), and are developed across resistor 41 to drive the grid of tube 22 positive; it will be noted from the last-mentioned graph of FIG. 2 that the pulses Q are somewhat lower and flatter, owing to the presence of condenser 47, than their companion spikes O. Upon the firing of either thyratron 19', 19" by the corresponding trigger pulse P', P" a current flows through a respective half of the primary of transformer 20 in series with choke 45 and battery 21. The autotransformer action of this primary impresses upon the plate of the opposite thyratron and its condenser an added positive potential so that, if the voltage drop across the ionized thyratron is considered negligible compared with the voltage of battery 21, the potential difference across the series condensers 43', 43" (and, also, across the inactive thyratron) will be substantially twice the battery voltage. A potential difference approximately equal to that battery voltage exists across tube 22, the negative spike appearing on the associated condenser upon the firing of the thyratron having been shunted to ground through diode 44.

When, for example, the thyratron 19' is conducting, the appearance of a quenching pulse Q on the grid of tube 22 effectively connects the junction of condensers 43' and 43", which is at positive battery potential, to the cathode of this thyratron so that the full voltage of condenser 43' lies across the tube 19' with such polarity as to cut off the current flow therethrough. Thereafter, as the thyratron 19" is triggered, the charge on condensers 43', 43" is reversed and the same sequence of operation is repeated with this thyratron. The current passing alternately through the thyratrons and transmitted through transformer 20 to load 23 has the shape of pulses T', T" as shown in FIG. 2(h).

The integrated magnitude of the output pulses T', T" charges the condenser 25 to a voltage which, if sufficient to break down the Zener diode 37, causes the flow of a feedback current through control windings 35', 35" so as partially to offset the biasing current passed by windings 33', 33", thereby partly desaturating the magnetic amplifier 30 and advancing the quenching pulses Q to shorten the duration of the pulses T', T" and to reduce the energy output of the system. In a state of balance, in which this output is of the desired magnitude, the voltage across condenser 25 will thus be at a value corresponding to a sharp bend on the reverse-voltage/current characteristic of Zener diode 37, i.e. to a point of incipient breakdown of that diode. The system of FIG. 1, accordingly, acts as a generator of stabilized alternating current which, if desired, may be rectified (e.g. by a network similar to the circuit 24', 24", 25) before being fed to the load 23.

In FIG. 3 I have shown a modified system in which elements having counterparts in FIG. 1 have been designated by the same reference numerals preceded by the digit "1." A reversal of connections applies the output (S12, S13) of source 110 to transformer 128 and the output (S30) of magnetic amplifier 130 to transformer 114. The thyratrons 19', 19" of the preceding embodiment have been replaced by controlled rectifiers 119', 119" whose cathode-gate circuits are alternately triggered in the rhythm of a source 110 of high-frequency alternating current by positive spikes generated by a differentiation circuit 115', 116', 115", 116" at the instants of pulses Q in FIG. 2(g) and passed by a pair of rectifiers 117', 117". The magnetic amplifier 130, whose main windings 129', 129" are energized by the rectangular pulses S12, S13 (FIG. 2) via conductors 126, 127, has its control windings 135', 135" connected across a source 150 of low-frequency signal current in series with a source of bias current 155 and an adjustable resistor 156. The differentiated output of switching transformer 128 is a train of pulses corresponding to the positive spikes P', P" of FIG. 2 and occurring with invariable timing, these quenching pulses being passed by a rectifier 148 and developed across resistor 141 at a cadence which is twice that of the train of pulses triggering either controlled rectifier 119', 119" at intervals determined by the control signal from source 150. The quenching pulses trigger a controlled rectifier 122 which is connected between ground and the junction of condensers 143', 143", in a manner analogous to that of tube 22 in FIG. 1, and is representative of various types of three-electrode electronic breakdown devices including thyratrons.

The output circuit of FIG. 3 differs from that of FIG. 1 in that the anodes of controlled rectifiers 119', 119" are connected not to the extremities of the primary of transformer 120 but to intermediate taps on that winding, about one quarter of its length from its ends. Also connected between these anodes is a further condenser 151 which resonates with the portion of the primary transformer winding bridged thereacross, at a frequency corresponding to that of source 110 and, therefore, to the cadence of pulses P' and P", so as to expedite the periodic reversal of the voltage across the series-connected condensers 143', 143". Furthermore, the choke 145 is connected in series with diode 144 so as to tend to increase the positive potential present on the common terminals of these latter condensers at the instant when the controlled rectifier 122 becomes conductive. The autotransformer action of the four-section primary of transformer 120 increases the voltage swing across the quenching condensers. The operation of the system in otherwise indentical with that of the circuit arrangement of FIG. 1, except that the output applied to load 123 by transformer 120 varies in accordance with the signal from source 150 instead of being stabilized at a predetermined level.

In FIG. 4 I have shown the output-versus-input characteristic of a representative system of the type illustrated in FIG. 3, with the output measured in volts (R.M.S.) and the input in milliamperes. It will be seen that this characteristic is substantially linear over a wide range. Illustrative values for the principal circuit constants involved are 11 microfarads for the capacitance of each condenser 143', 143", 151, 21.6 millihenries for the inductance of choke 145, and 400 cycles per second for the operating frequency of source 110. The efficiency has been found to vary from 85.1% to 95% for input voltages (battery 121) ranging from 165 to 78 volts and a constant R.M.S. output of 115 volts and 7500 watts, the corresponding input currents varying between 53.4 and 101.0 amperes.

As will be apparent from FIG. 2, the operating current for the breakdown devices 19', 19" or 119', 119" need not be supplied by a D.-C. source such as a battery 21 or 121 but may be a raw-rectified or a sinusoidal alternating current, e.g. one of relatively low frequency (the system remaining inoperative during alternate half-cycles thereof) or one whose frequency is an even multiple of the frequency of switching-voltage source 10 or 110 if the maximum duration of pulses T', T" is not to exceed a corresponding fraction of signal wave S10. Various other modifications readily apparent to persons skilled in the art, including interchange or combination of compatible features disclosed in connection with the embodiments of FIGS. 1 and 3, are intended to be embraced within the scope of the present invention as defined in the appended claims.

I claim:

1. A generator of alternating current, comprising a pair of electronic breakdown devices each with two output electrodes and a control electrode for triggering it into a conductive condition, said devices being provided with an output circuit including a source of operating current connected across the respective output electrodes thereof, at least two condensers connected in series between corresponding output electrodes of said devices, a normally non-conductive discharge device connected between the junction of said condensers and the remaining output electrodes of said breakdown devices, a source of first pulses connected to said control electrodes for alternately rendering said devices conductive, a source of second pulses synchronized with said source of first pulses connected to said discharge device for periodically rendering the latter conductive and terminating the conductive condition of either of said breakdown devices by momentarily connecting the proximal one of said condensers across its output electrodes in a manner applying a quenching potential thereto, and timer means coupled with said pulse sources for varying the relative spacing of the respective pulses thereof, thereby adjusting the duration of said conductive condition.

2. A generator according to claim 1 wherein said pulse sources comprise a source of alternating current of substantially fixed frequency and two differentiation circuits concurrently driven by said alternating-current source.

3. A generator according to claim 2 wherein said timer means comprises a delay device inserted between said alternating-current source and one of said differentiation circuits.

4. A generator according to claim 3 wherein said delay device comprises a magnetic amplifier.

5. A generator according to claim 4 wherein said magnetic amplifier has a control winding coupled to said output circuit for stabilizing the operation of said breakdown devices.

6. A generator according to claim 5, further comprising an avalanche diode connected in series with said control winding for normal operation at a near-breakdown point of its characteristic.

7. A generator according to claim 4 wherein said magnetic amplifier has a control winding, further comprising a source of signals of relatively low frequency connected across said control winding for varying the output of said breakdown device.

8. A generator of alternating current, comprising a pair of electronic breakdown devices each with two output electrodes and a control electrode for triggering it into a conductive condition, said devices being provided with an output circuit including a source of operating current connected across the respective output electrodes thereof, at least two condensers connected in series between corresponding output electrodes of said devices, inductance means connected across said condensers, a normally non-conductive discharge device connected between the junction of said condensers and the remaining output electrodes of said breakdown devices, a source of first pulses connected to said control electrodes for alternately rendering said devices conductive, and a source of second pulses synchronized with said source of first pulses connected to said discharge device for periodically rendering the latter conductive and terminating the conductive condition of either of said breakdown devices by momentarily connecting the proximal one of said condensers across its output electrodes in a manner applying a quenching potential thereto.

9. A generator according to claim 8 wherein said inductance means comprises a primary winding of a transformer coupled to a load.

10. A generator according to claim 8 where said inductance means comprises an autotransformer winding having intermediate taps connected to said corresponding output electrodes whereby two extreme portions of said winding are in series with said condensers, respectively, and the associated breakdown devices.

11. A generator according to claim 10, further comprising capacitive means connected across a central portion of said winding between said intermediate taps.

12. A generator according to claim 11 wherein said capacitive means and said central portion are resonant at a frequency corresponding substantially to the cadence of alternate ones of said first pulses.

13. A generator of alternating current, comprising a pair of electronic breakdown devices each with two output electrodes and a control electrode for triggering it into a conductive condition, said devices being provided with an output circuit of direct current connected across the respective output electrodes thereof, at least two condensers connected in series between corresponding output electrodes of said devices, inductance means connected across said condensers, a normally non-conductive discharge device connected between the junction of said condensers and the remaining output electrodes of said breakdown devices, rectifier means connected between said remaining output electrodes in opposition to said direct-current source, a source of first pulses connected to said control electrodes for alternately rendering said devices conductive, and a source of second pulses synchronized with said source of first pulses connected to said discharge device for periodically rendering the latter conductive and terminating the conductive condition of either of said breakdown devices by momentarily connecting the proximal one of said condensers across its output electrodes in a manner applying a quenching potential thereto.

14. A generator according to claim 13, further comprising a choke connected in series with said source of direct current.

15. A generator according to claim 14 wherein said choke lies in series with said rectifier means.

16. A generator of alternating current, comprising a pair of electronic breakdown devices each with two output electrodes and a control electrode for triggering it into a conductive condition, said devices being provided with an output circuit including a source of direct current connected across the respective output electrodes thereof, at least two condensers connected in series between corresponding output electrodes of said devices inductance means connected across said condensers, a normally nonconductive discharge device connected between the junction of said condensers and the remaining output electrodes of said breakdown devices, rectifier means between said junction and said remaining output electrodes in opposition to said direct-current source, a source of first pulses connected to said control electrodes for alternately rendering said devices conductive, a source of second pulses synchronized with said source of first pulses connected to said discharge device for periodically rendering the latter conductive and terminating the conductive condition of either of said breakdown devices by momentarly connecting the proximal one of said condensers across its output electrodes in a manner applying a quenching potential thereto, and timer means coupled with said pulse sources for varying the relative spacing of the respective pulses thereof, thereby adjusting the duration of said conductive condition.

17. A generator according to claim 16 wherein said discharge device comprises a further electronic breakdown device.

References Cited by the Examiner

UNITED STATES PATENTS

| | | | |
|---|---|---|---|
| 2,544,683 | 3/51 | Hoeppner et al. | 315—229 XR |
| 2,673,936 | 3/54 | Harris | 307—107 X |
| 2,955,215 | 10/60 | Eisen | 307—149 X |

ORIS L. RADER, *Primary Examiner.*

MILTON O. HIRSHFIELD, *Examiner.*